Figure 1:
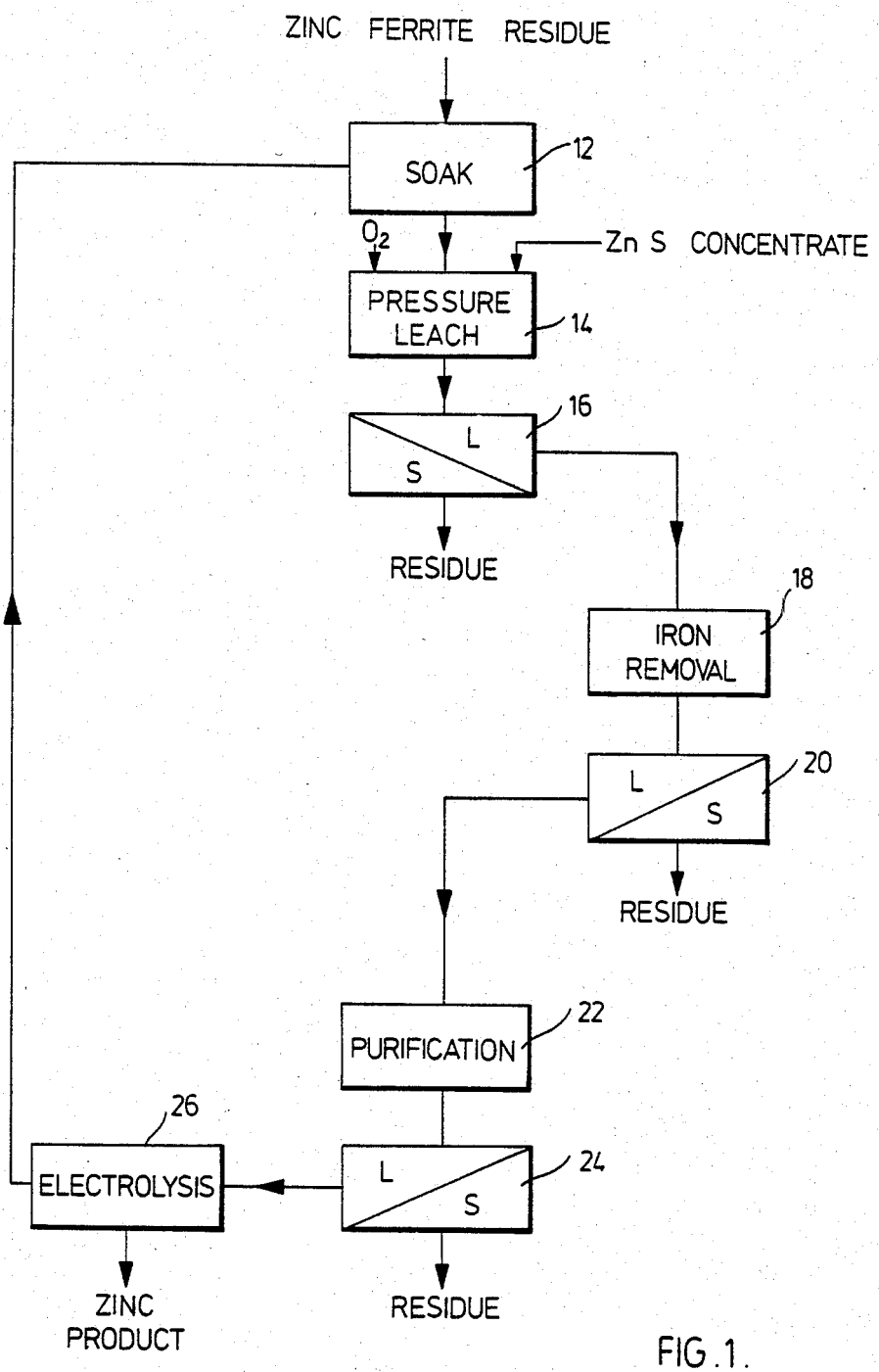

United States Patent [19]

Bolton et al.

[11] Patent Number: 4,510,028

[45] Date of Patent: Apr. 9, 1985

[54] PROCESS FOR RECOVERING ZINC FROM ZINC FERRITE MATERIAL

[75] Inventors: Gerald L. Bolton; Donald R. Weir, both of Fort Saskatchewan, Canada

[73] Assignee: Sherritt Gordon Mines Limited, Toronto, Canada

[21] Appl. No.: 508,693

[22] Filed: Jun. 28, 1983

Related U.S. Application Data

[63] Continuation-in-part of Ser. No. 327,317, Dec. 4, 1981, abandoned.

[30] Foreign Application Priority Data

Aug. 5, 1981 [CA] Canada .................................. 383267

[51] Int. Cl.[3] .............................................. C22B 19/22
[52] U.S. Cl. ................................. 204/119; 75/101 R;
75/108; 75/115; 75/120; 423/106; 423/109;
423/140; 423/150
[58] Field of Search ............. 75/120, 115, 104, 101 R,
75/108; 423/106, 109, 150, 140; 204/119

[56] References Cited

U.S. PATENT DOCUMENTS 3,143,486  8/1964  Pickering .............................. 75/120
3,867,268  2/1975  Kawulka et al. ................... 204/119
4,004,991  1/1977  Veltman et al. ..................... 423/109
4,274,931  6/1981  Verbaan ............................. 423/109

OTHER PUBLICATIONS

Babadzhan, A. A. et al., Tsvetnye Metally, The Soviet Journal of Non-Ferrous Metals vol. 6, #5 English Trans. 1965, pp. 31-34.

Primary Examiner—Gary P. Straub
Assistant Examiner—Robert L. Stoll
Attorney, Agent, or Firm—Robert F. Delbridge; Arne I. Fors

[57] ABSTRACT

A process for recovering zinc from material containing zinc ferrite includes leaching the ferrite containing material together with zinc sulphide containing material in a leach step, with the relative amounts of ferrite material and zinc sulphide material being such that the zinc present as zinc ferrite is a minor proportion of the total zinc content of the ferrite material and the zinc sulphide material. The leach step is carried out in aqueous sulphuric acid solution at elevated pressure under oxidizing conditions and at a temperature above the melting point of sulphur, with the sulphuric acid to zinc molar ratio being less than about 1.2:1, to cause dissolution of a substantial amount of zinc from the ferrite material and from the sulphide material.

11 Claims, 3 Drawing Figures

PROCESS FOR RECOVERING ZINC FROM ZINC FERRITE MATERIAL

This is a continuation-in-part of application Ser. No. 327,317 filed Dec. 4, 1981, now abandoned.

This invention relates to the recovery of zinc from material containing zinc ferrite.

In the past, zinc has been recovered from material containing zinc sulphide by first roasting the material to oxidize most of the zinc sulphide content to zinc oxide, and then leaching the resultant calcine under atmospheric pressure in aqueous sulphuric acid solution to produce a zinc sulphate solution. Zinc is usually recovered from the zinc sulphate solution by electrolysis.

However, naturally occurring zinc sulphide material normally also contains iron and, during the roasting step, some of the zinc combines with the iron to form zinc ferrite, which is substantially insoluble in the subsequent leaching step which is conducted under conditions beneficial to the dissolution of zinc oxide.

Attempts have been made to provide economical processes for recovering zinc from such zinc ferrite material. For example, U.S. Pat. No. 3,193,382 issued July 6, 1965 describes a process in which the zinc ferrite is first subjected to a first stage pressure leach under non-oxidizing conditions and is then subjected to a second stage pressure leach under oxidizing conditions, with the first stage leach being improved by adding minor amounts of a reducing agent such as zinc sulphide material to produce reducing conditions in the first stage leach. As mentioned in U.S. Pat. No. 3,193,382, an important feature of the process is the provision of non-oxidizing conditions during the first stage leach to dissolve iron from the ferrite material, with at least some of the dissolved iron subsequently being converted to an insoluble iron compound in the second stage leach.

A disadvantage of the above mentioned process of recovering zinc from zinc ferrite material and of other known processes for the same purpose is that it is a process which has to be carried out independently of the calcine leaching process, since the conditions required for successfully leaching calcine containing zinc oxide are quite different from conditions required for successfully leaching zinc ferrite material.

There are other processes for treating zinc ferrite material, for example leaching under oxidizing conditions with very high excess acid, converting the iron content to jarosite, geothite or hematite, or the fuming of the material. However, for one reason or another, large stockpiles of zinc ferrite material have accumulated in various places where zinc sulphide roasting has been carried out.

Leaching processes have been developed which do not require the preliminary roasting step, it having been found possible to directly leach the zinc sulphide material. For example, U.S. Pat. No. 3,867,268, issued Feb. 18, 1975 and U.S. Pat. No. 4,004,991, issued Jan. 25, 1977 describe processes in which the zinc sulphide material is leached under oxidizing conditions and elevated pressure to provide a zinc sulphate solution from which, after appropriate intermediate treatment, zinc is recovered by electrolysis.

U.S. Pat. No. 3,867,268 teaches (see column 4, lines 30 to 39) that there should preferably be an excess of acid in the leach slurry over the amount required to combine stoichiometrically with all zinc values in the slurry to produce zinc sulphate, but that there should not be a large excess of acid because the reaction rate is not greatly increased by such excess and because the amount of dissolved iron and free acid in the leach end solution would be undesirably high. It is recommended that an acid to zinc stoichiometric excess should not exceed about 1.2:1, i.e. should not exceed about 20%. The patent also teaches that the leaching is preferably carried out in the presence of a surface active compound, such as calcium lignosulphonate or quebracho, to render the sulphide material wettable by the aqueous acid solution in preference to molten sulphur.

However, about 75% of world zinc production is still carried out by first subjecting zinc sulphide material to a roasting step to form a zinc oxide calcine. In view of this, and also in view of the existence of large stockpiles of zinc ferrite material, there is therefore still a need for an economic process for recovering zinc from zinc ferrite material.

It has been unexpectedly found that satisfactory recovery of zinc from zinc ferrite material can be obtained by leaching the zinc ferrite material in an oxidizing pressure leach process in which zinc sulphide material is being leached in accordance with the teachings of U.S. Pat. No. 3,867,268, i.e. in which the stoichiometric acid excess relative to the total zinc content does not exceed about 20%. According to the invention, zinc ferrite material is combined with zinc sulphide material in such a proportion that the zinc present as zinc ferrite forms a minor amount of the total zinc content of the combined ferrite material and sulphide material, and the combined material is leached in an oxidizing pressure leach process.

In the prior art, it has only been found that zinc can be recovered from zinc ferrite material by leaching under non-oxidizing conditions, or under oxidizing conditions with extremely high excess acid. The reason why zinc can be satisfactorily recovered from zinc ferrite material in accordance with the present invention is not clear. It may be that the larger amount of zinc present as zinc sulphide in the oxidizing leach process produces relatively non-oxidizing conditions sufficient to cause breakdown of the zinc ferrite material. Good zinc recovery results have been obtained where up to about 40% of the total zinc content of the combined material was present as zinc ferrite, although it appears that best results are obtained when less than about 20% of the total zinc content of the combined ferrite and sulphide material is in ferrite form.

According to the present invention therefore, a process for recovering zinc from material containing zinc ferrite comprises leaching the ferrite containing material together with zinc sulphide containing material in a leach step, with the relative amounts of ferrite containing material and sulphide containing material being such that the zinc present as zinc ferrite is a minor proportion of the total zinc content of the ferrite material and the sulphide material, the leach step being carried out in aqueous sulphuric acid solution at elevated pressure under oxidizing conditions and at a temperature above the melting point of sulphur, with the sulphuric acid to zinc molar ratio being less than about 1.2:1, to effect dissolution of a substantial amount of zinc from the ferrite material and the sulphide material to provide a leach solution and undissolved residue, and separating the leach solution from the undissolved residue.

Preferably, the zinc present as zinc ferrite is in the range of from about 5% to about 40% and more preferably from about 5% to about 20%, of the total zinc content of the ferrite material and the sulphide material. The leach is preferably carried out at a temperature in the range of from about 135° C. to about 175° C. under an oxygen partial pressure in the range of from about 30 to about 700 kPa. Also, the leach is preferably carried out with an initial slight stoichiometric excess of sulphuric acid relative to the total zinc content of the ferrite material and the sulphide material.

The undissolved residue may be leached in a second leach in aqueous sulphuric acid solution at elevated pressure under oxidizing conditions and at a temperature above the melting point of sulphur with the sulphuric acid to zinc molar ratio being less than about 1.2:1, to dissolve further zinc from the zinc ferrite and zinc sulphide in the residue to produce a further leach solution and a further undissolved residue, with the further leach solution then being separated from the further residue, and with the further leach solution being recycled to the first mentioned leach step.

The present invention can also be effectively combined with a roast-leach process for the recovery of zinc. Accordingly, the invention also provided a process for recovering zinc from material containing zinc sulphide comprising roasting a portion of the zinc sulphide material to produce a calcine containing zinc oxide and zinc ferrite, leaching the calcine in a leach in aqueous sulphuric acid solution to effect dissolution of zinc oxide and produce a leach solution and undissolved residue containing zinc ferrite, separating the leach solution from the undissolved residue, and electrolyzing the leach solution to produce elemental zinc and spent solution. The zinc ferrite residue and another portion of the zinc sulphide material are then leached in a pressure leach step, with the zinc present as zinc ferrite being a minor portion of the total zinc content of the ferrite residue and the sulphide material, the process including leaching the combined material in the pressure leach step in aqueous sulphuric acid solution at elevated pressure under oxidizing conditions at a temperature above the melting point of sulphur with the sulphuric acid to zinc molar ratio being less than about 1.2:1, to dissolve a substantial amount of zinc from the ferrite residue and the sulphide material and produce a further leach solution and further undissolved residue, separating the further leach solution from the further undissolved residue, passing the further leach solution to the first mentioned leach, and recycling spent solution from the electrolysis step to the first mentioned leach and to the pressure leach.

Figure 2:
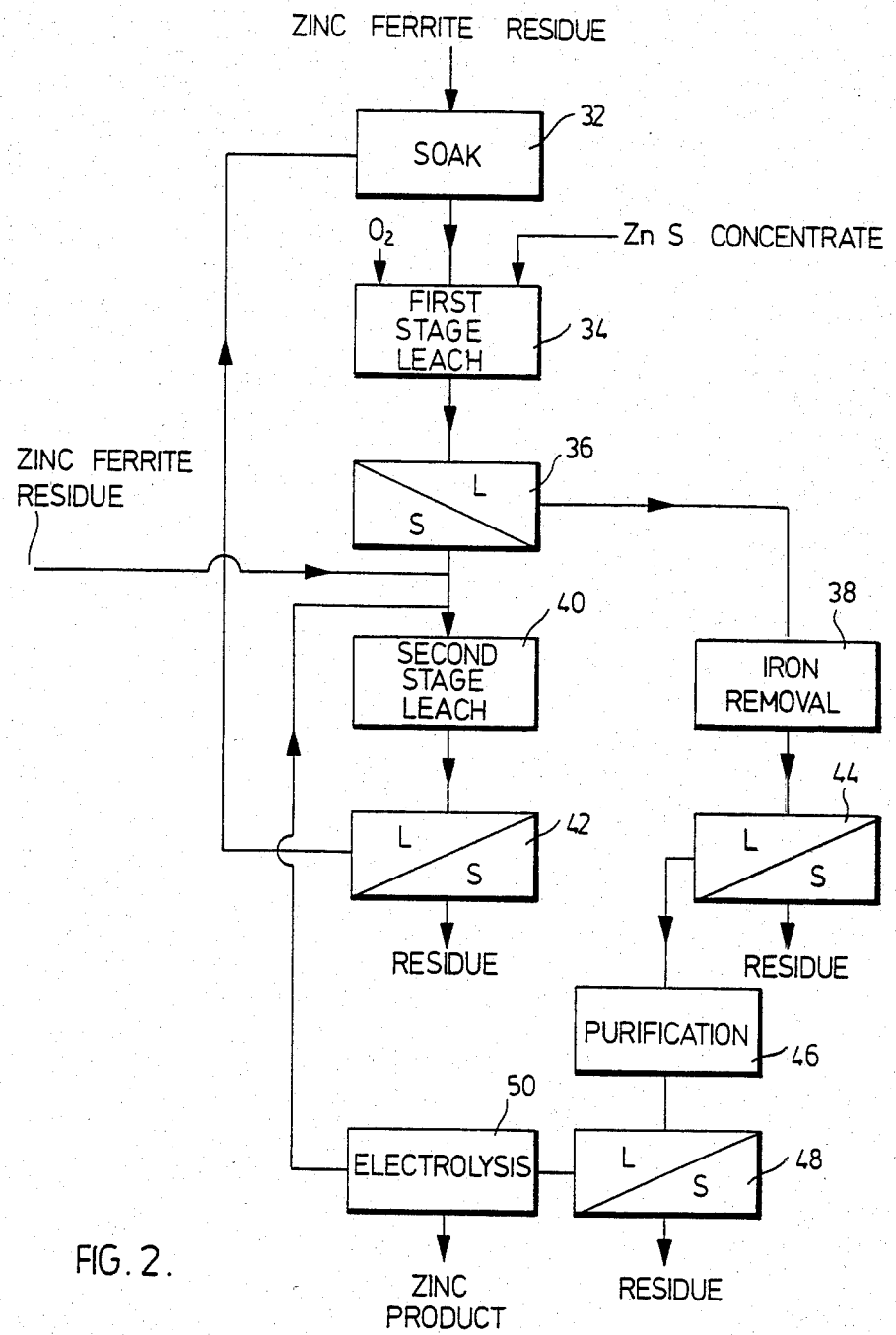
Figure 3:
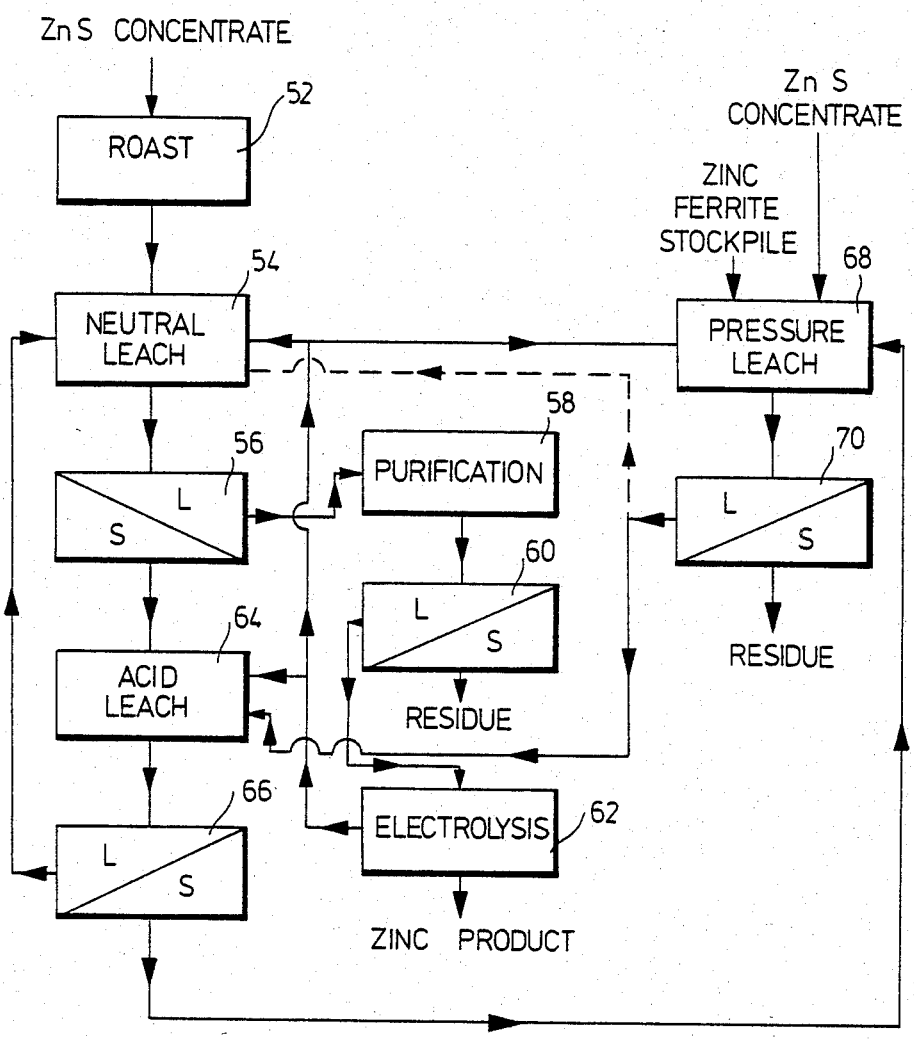

Embodiments of the invention will now be described by way of example, with reference to the accompanying drawings, of which:

FIG. 1 is a flow diagram of a zinc recovery process with a single stage pressure leach in accordance with the invention, FIG. 2 is a flow diagram of a zinc recovery process with a two-stage pressure leach in accordance with the invention, and FIG. 3 is a flow diagram of a zinc recovery process including a pressure leach in accordance with the invention combined with a roast leach process.

Referring first to FIG. 1, ground residue containing zinc ferrite, from a process in which zinc sulphide material has been roasted, may first be soaked in aqueous sulphuric acid solution in a soaking or pre-leach step 12 at the normal boiling point of the solution for a period of time to dissolve some of the iron and zinc in the ferrite with resultant consumption of a corresponding amount of sulphuric acid. As will be described in more detail later, the aqueous sulphuric acid solution may be spent electrolyte from a zinc electrolysis step.

The resultant ferrite slurry is then passed to a leach step 14 to which ground zinc sulphide concentrate is also supplied. The relative amounts of zinc ferrite residue and zinc sulphide concentrate are such that the zinc present as zinc ferrite forms a minor proportion of the total zinc content thereof, preferably from about 5% to about 40%, and more preferably less than about 20%.

Alternatively, the soaking or pre-leach step 12 may be omitted, in which case the ferrite material and the sulphide material are preferably ground together to provide an intimate mixture for the leach step 14.

The combined material is then leached and subsequently treated in a manner similar to that described in previously mentioned U.S. Pat. No. 3,867,268 which is concerned with the recovery of zinc from zinc sulphide material. The combined material is accordingly pressure leached in leach step 14 with a slight stoichiometric excess of acid relative to the total zinc content, for example about 1.05:1 at a temperature above the melting point of sulphur, for example in the range of from about 135° C. to about 175° C., under an oxygen partial pressure in the range of from about 30 to about 700 kPa. During the leach step 14, a substantial amount of zinc is dissolved from both the zinc sulphide concentrate and the zinc ferrite residue.

Leached slurry from the leach step 14 is passed to a liquid/solids separation step 15. The solids may be subjected to further treatment for the recovery of other metal values contained therein, and the leach solution is passed to an iron removal step 18 where iron in solution is precipitated in an appropriate manner, as will be apparent to a person skilled in the art. The iron precipitate is removed in a liquid/solids separation step 20, and the precipitate is discarded. The pregnant solution from separation step 20 proceeds to a purification step 22 where appropriate purification steps are carried out, the nature of which will also be apparent to a person skilled in the art.

Precipitate from the purification step 22 is removed in a liquid/solids separation step 24, with the solids normally being subjected to further treatment. The purified pregnant solution is passed to an electrolysis step 26 where product zinc is obtained at the cathode. Spent solution from the electrolysis step 26 is recycled to the ferrite soak step 12 is previously mentioned. If the soak step 12 is omitted, the spent solution is recycled to the leach step 14.

Referring now to FIG. 2, zinc ferrite residue is subjected to a soak or pre-leach step 32, if necessary, similar to the corresponding 12 just described with reference to FIG. 1. The resultant ferrite slurry is passed to a first stage leach 34 to which an appropriate amount of ground zinc sulphide concentrate is also supplied. The relatively amounts of zinc ferrite residue and zinc sulphide concentrate are such that the zinc present as zinc ferrite forms a minor proportion of the total zinc content thereof, preferably from about 5% to about 40%, and more preferably less than about 20%.

The combined material is then treated for the recovery of zinc in a manner similar to that described in previously mentioned U.S. Pat. No. 4,004,991, which describes a two-stage oxidizing pressure leach process for the recovery of zinc from zinc sulphide material. Thus, the combined material is pressure leached in the first stage leach 34 under conditions similar to those of leach step 14 of FIG. 1. During the first stage leach 34, an appreciable amount of zinc is dissolved from the zinc sulphide and zinc ferrite.

The leached slurry from the first stage leach 34 is passed to a liquid/solids separation step 36, from which the leach solution proceeds to an iron removal step 38 which will be referred to later, and from which the solids proceed to a second stage leach 40. The solids in the second stage leach 40 are pulped with spent electrolyte from an electrolysis step which will also be referred to later. Also, in accordance with the invention, further zinc ferrite residue is added to the second stage leach 40, again in an amount such that the amount of ferrite zinc in the second stage leach 40 is a minor proportion of the total zinc content of the combined solid material, that is to say preferably from about 5% to about 40%, and more preferably less than about 20%.

The conditions under which the second stage leach 40 is carried out are similar to those under which the first stage leach 34 is carried out, that is to say conditions similar to those of leach step 14 of FIG. 1. During the second stage leach 40, a further amount of zinc is dissolved from the zinc sulphide and zinc ferrite, such that a substantial amount of zinc is dissolved from the zinc sulphide and zinc ferrite in the first and second stage leaches 34, 40.

From the second stage leach 40, the leached slurry proceeds to a liquid/solids separation step 42. The solids are further treated if desired and the leach solution is recycled to the soak step 32, or to the first stage leach 34 if the soak step 32 is omitted. The leach solution from the first stage leach 34 passes through the iron removal step 38 and then to a liquid/ solids separation step 44. The solids are discarded, and the pregnant leach solution passes to a purification step 46 and a liquid/solids separation step 48. The solids are further treated if desired, and the purified pregnant solution passes to an electrolysis step 50 from which product zinc is obtained at the cathode. Spent electrolyte is then recycled to the second stage leach 40.

In the embodiment just described with reference to FIG. 2, zinc ferrite residue was added both to the first stage leach and to the second stage leach. It is also within the scope of the invention to add zinc ferrite residue only to the first stage leach or only to the second stage leach.

FIG. 3 shows a flow diagram of a zinc recovery process including a pressure leach in accordance with the invention combined with a roast-leach process.

In the roast-leach process, ground zinc concentrate is roasted in a roast step 52 at a temperature in the range of from about 850° C. to about 1,000° C. to oxidize most of the zinc sulphide content to zinc oxide. As explained earlier, naturally occurring zinc sulphide material normally also contains iron and, during the roasting step, some of the zinc combines with the iron to form zinc ferrite.

The resulting calcine is then leached in a so-called neutral leach step 54 in aqueous sulphuric acid solution under conditions beneficial to the dissolution of zinc oxide. Such a leach is normally carried out under atmospheric pressure at a temperature in the range of from about 60° C. to about 95° C. and at a pH of about 5. Sulphuric acid solution is recycled to the neutral leach 54 from other steps in the process as will be described later. The leached slurry from the neutral leach 54 is passed to a liquid/solids separation step 56, and the resultant pregnant solution passes to a purification step 58 and to a subsequent liquid/solids separation step 60. The solids from separation step 60 are further treated if desired, and the purified pregnant solution passes to an electrolysis step 62 from which product zinc is obtained at the cathode. The spent electrolyte is recycled to the neutral leach 54 and to other leach steps as will be described later.

The solids from the neutral leach separation step 56 are then leached in a so-called acid leach 64 in aqueous sulphuric acid solution to dissolve zinc which was not dissolved in the neutral leach 54. Such an acid leach is usually carried out under atmospheric pressure at a temperature in the range of from about 80° to about 95° C. and at a pH of less than 3. A portion of the sulphuric acid solution used in the acid leach 54 is supplied from the electrolysis step 62. The leached slurry from the acid leach 64 then passes to a liquid/solids separation step 66, from which the separated solution is recycled to the neutral leach 54.

There will have been no significant dissolution of zinc from zinc ferrite in the neutral leach 54 or in the acid leach 64, and hence substantially all the zinc ferrite produced in the roast step 52 will be present in the solids separated in the acid leach separation step 66. According to this embodiment of the invention, these solids containing zinc ferrite are subjected to a pressure leach step 68 to which zinc sulphide concentrate is also supplied. The relative amounts of zinc ferrite residue and zinc sulphide concentrate are such that the zinc present as ferrite forms a minor proportion of the total zinc content thereof, preferably from about 5% to about 40%, and more preferably less than about 20%.

In pressure leach step 16, the combined material is leached with a slight stoichiometric excess of sulphuric acid relative to the zinc content at a temperature above the melting point of sulphur, for example in the range of from about 135° C. to about 175° C., under an oxygen partial pressure from about 30 to about 700 kPa. The aqueous sulphuric acid solution used in the pressure leach 68 is obtained from the electrolysis step 62. During this oxidizing pressure leach step 68, a substantial amount of zinc is dissolved from both the zinc ferrite and the zinc sulphide. If desired, a portion of the zinc ferrite treated in the pressure leach step 68 may be zinc ferrite material from a previously accumulated stockpile thereof.

The leached slurry from the pressure leach 68 passes to a liquid-solids separation step 70, from which the solids may be subjected to further treatment for the recovery of other metal values contained therein. The leach solution is passed to the acid leach 64 and/or to the neutral leach 54. Thus, the leach solution from the pressure leach 68 does not have to be subjected to a separate iron removal step because iron is removed from the solution in the acid leach 64 or in the neutral leach 54.

The embodiment described with reference to FIG. 3 thus provides an advantageous way of using the present invention in conjunction with an existing roast-leach process.

Specific examples of processes in accordance with the invention will now be described.

EXAMPLE 1

Four tests were carried out with residue containing zinc ferrite and analyzing 24% zinc, 0.5% copper, 32% iron and 4% total sulphur, and with zinc sulphide concentrate ground to less than 325 Tyler mesh and analyzing 46% zinc, 0.6% copper, 14% iron and 34% total sulphur.

In each test, zinc ferrite residue and zinc sulphide concentrate was added to spent electrolyte solution containing 50 gpl zinc and 150 gpl sulphuric acid, together with 0.1 g/L calcium lignosulphonate and 0.2 g/L quebracho. The combined material was pressure leached at a temperature of 150° C. under a partial pressure of oxygen of 690 kPa, with these being an initial slight stoichiometric excess of sulphuric acid.

The relative quantities of zinc ferrite material and zinc sulphide material were such that 20% of the zinc in the combined material was present as zinc ferrite. At various times during the pressure leach, the solution was analyzed and the percentage extraction of total zinc was calculated. Microscopic inspection of residue was carried out to determine the percentage zinc extraction from the zinc ferrite residue. The results are shown in Table I.

TABLE I

| Retention Time (h) | Overall Zinc Extraction (%) | Zinc Extraction from Ferrite Residue (%) |
| --- | --- | --- |
| 1.0 | 88.7 | 51.5 |
| 1.5 | 96.7 | 91.5 |
| 2.0 | 96.9 | 92.5 |
| 2.5 | 96.4 | 90.0 |

EXAMPLE 2

Tests were carried out with a two-stage leach with zinc ferrite residue only being added to the second stage leach. The results are shown in Table II.

TABLE II

| % of Zn in feed as Zinc Ferrite | Retention Time (h) | Overall Zinc Extraction (%) | Zinc Extraction from Ferrite Residue (%) |
| --- | --- | --- | --- |
| 10 | 0.5 h 1st stage 1.0 h 2nd stage | 98.9 | 98.0 |
| 20 | 0.5 h 1st stage 1.0 h 2nd stage | 94.4 | 76.0 |

The advantages of the invention will be clear to a person skilled in the art from the above described embodiments and examples. Other embodiments and examples of the invention will also be apparent to a person skilled in the art, the scope of the invention being defined in the apended claims.

What we claim as new and desire to protect by Letters Patent of the United States is:

1. A process for recovering zinc from iron-containing and zinc sulphide containing material comprising leaching the material in aqueous sulphuric acid solution at elevated pressure under oxidizing conditions and at a temperature in the range of from about 135° C. to about 175° C. with the starting sulphuric acid to zinc molar ratio being less than about 1.2:1 to cause dissolution of a substantial amount of zinc from the sulphide material and to produce a zinc-containing leach solution and an iron-containing undissolved residue, and separating the zinc-containing solution from the iron-containing undissolved residue, and also including the step of adding zinc ferrite containing material to said zinc sulphide containing material to cause the zinc present as zinc ferrite in said leaching to be in the range of from about 5% to about 40% of the total zinc content of the ferrite material and the zinc sulphide material, with the sulphuric acid to total zinc molar ratio being less than about 1.2:1, and to cause at least about 51.5% of zinc to be dissolved from the ferrite material in addition to the substantial amount of zinc dissolved from the sulphide material.

2. A process according to claim 1 wherein the zinc present as zinc ferrite is in the range of from about 5% to about 20% of the totaL zinc content of the ferrite material and the sulphide material.

3. A process according to claim 1 wherein the leach step is carried out under a oxygen partial pressure in the range of from about 30 to about 700 kPa.

4. A process according to claim 3 wherein the leach step is carried out with an initial slight stoichiometric excess of sulphuric acid to the total zinc content of ferrite material and the sulphide material.

5. A process according to claim 1 wherein said undissolved residue is leached in a second leach step in aqueous sulphuric acid solution at elevated pressure under oxidizing conditions and at a temperature in the range of from about 135° to about 175° C., with the sulphuric acid to zinc molar ratio being less than about 1.2:1 to dissolve further zinc from the zinc ferrite and zinc sulphide in the residue to produce a further leach solution and a further undissolved residue, separating the further leach solution from the further undissolved residue, and recycling the further leach solution to the first mentioned leach step.

6. A process according to claim 1 wherein said leaching is carried out in the presence of an effective amount of a surface active compound to render the sulphide material wettable by the aqueous acid solution in preference to molten sulphur.

7. A process for recovering zinc from material containig zinc sulphide and iron comprising roasting a portion of the sulphide material to produce a calcine containing zinc oxide and zinc ferrite, leaching the calcine in aqueous sulphuric acid solution to effect dissolution of zinc oxide and produce a leach solution and undissolved residue containing zinc ferrite, separating the leasch solution from the undissolved residue, electrolyzing the leach solution to produce element zinc and spent solution, supplying residue containing zinc ferrite and another portion of the suphide material to a pressure leach with the relative amounts of residue and sulphide material being such that the zinc present as zinc ferrite is in the range of from about 5% to about 40% of the total zinc content of the ferrite residue and sulphide material, said pressure leach step being carried out in aqueous sulphuric acid solution at elevated pressure under oxidizing conditions at a temperatue in the range of from about 135° to about 175° C., with the starting sulphuric acid to zinc molar ratio being less than about 1.2:1, to dissolve at least about 51.5% of zinc from the ferrite residue and a substantial amount of zinc from the sulphide material and produce a further leach solution and further undissolved residue, separating the further leach solution from the further undissolved residue, passing the further leach solution to the first mentioned leach, a recycling spent solution from the electrolysis step to the first mentioned leach and to the pressure leach.

8. A process according to claim 7 wherein the zinc present as zinc ferrite in the pressure leach is in the range of from about 5 to about 20% of the total zinc content of the ferrite residue and the sulphide material.

9. A process according to claim 7 wherein the pressure leach is carried out under an oxygen partial pressure in the range of from about 30 to about 700 kPa.

10. A process according to claim 9 wherein the pressure leach is carried out with an initial slight stoichiometric excess of sulphuric acid relating to the total zinc content of the ferrite residue and the sulphide material.

11. A process according to claim 7 wherein said pressure leach step is carried out in the presence of an effective amount of a surface active compound to render the sulphide material wettable by the aqueous acid solution in preferance to molten sulphur.

* * * * *